(12) United States Patent
Czigler et al.

(10) Patent No.: US 12,515,011 B2
(45) Date of Patent: Jan. 6, 2026

(54) MAGNETIC RESONANCE COMPATIBLE WEIGHTED BLANKET

(71) Applicant: GE Precision Healthcare LLC, Waukesha, WI (US)

(72) Inventors: Michael Joseph Czigler, Cleveland, OH (US); Taylan Dalveren, North Ridgeville, OH (US)

(73) Assignee: GE Precision Healthcare LLC, Waukesha, WI (US)

( * ) Notice: Subject to any disclaimer, the term of this patent is extended or adjusted under 35 U.S.C. 154(b) by 314 days.

(21) Appl. No.: 18/356,329

(22) Filed: Jul. 21, 2023

(65) Prior Publication Data
US 2025/0025661 A1 Jan. 23, 2025

(51) Int. Cl.
*A61M 21/02* (2006.01)
*A47G 9/02* (2006.01)
*A61M 21/00* (2006.01)
*G01R 33/34* (2006.01)

(52) U.S. Cl.
CPC ....... *A61M 21/02* (2013.01); *G01R 33/34084* (2013.01); *A47G 9/0223* (2013.01); *A61M 2021/0022* (2013.01); *A61M 2021/005* (2013.01); *A61M 2207/00* (2013.01)

(58) Field of Classification Search
CPC .......... A61M 21/02; A61M 2021/0022; A61M 2021/005; A61M 2207/00; G01R 33/34084; A47G 9/0223; A61F 5/3776; A61F 7/0097
USPC .......................................................... 607/96
See application file for complete search history.

(56) References Cited

U.S. PATENT DOCUMENTS

| | | | |
|---|---|---|---|
| 11,185,661 B1* | 11/2021 | Loos | A61M 21/02 |
| 2019/0021525 A1* | 1/2019 | Hamm | B32B 7/08 |
| 2019/0387904 A1 | 12/2019 | Hiebert | |
| 2020/0170424 A1* | 6/2020 | Xu | A47G 9/0223 |
| 2020/0238045 A1* | 7/2020 | Pacheco | A61M 21/02 |
| 2020/0352473 A1 | 11/2020 | Chen et al. | |
| 2021/0169244 A1* | 6/2021 | Pope | A47G 9/02 |
| 2024/0012073 A1* | 1/2024 | Brickler | G01R 33/3415 |
| 2024/0156285 A1* | 5/2024 | Latham | A47G 9/0223 |

FOREIGN PATENT DOCUMENTS

| | | | | |
|---|---|---|---|---|
| EP | 3461377 A1 * | 4/2019 | | A01K 13/008 |
| EP | 3874994 A1 * | 9/2021 | | A41B 13/06 |

OTHER PUBLICATIONS

Becklund et al., "Using weighted blankets in an inpatient mental health hospital to decrease anxiety," Journal of Integrative Medicine, 2021, vol. 19, 134 pgs.

Nordahl et al., "Methods for acquiring MRI data in children with autism spectrum disorder and intellectual impairment without the use of sedation," Journal of Neurodevelopmental Disorders, 2016, 10 pgs.

Horien et al., "Implementation of a pre- and in-scan system to minimize head motion in pediatric participants undergoing fMRI scans," Mar. 5, 2020, 36 pgs.

* cited by examiner

Primary Examiner — Beverly M Flanagan
(74) Attorney, Agent, or Firm — Flecher Yoder, P.C.

(57) ABSTRACT

A weighted blanket includes a flexible and woven fabric enclosure. The weighted blanket also includes a non-proton signal generating and non-distorting material enclosed within the flexible and woven fabric enclosure. The weighted blanket is magnetic resonance compatible for use on a subject during a magnetic resonance imaging scan.

18 Claims, 6 Drawing Sheets

MAGNETIC RESONANCE COMPATIBLE WEIGHTED BLANKET

BACKGROUND

The subject matter disclosed herein relates to medical imaging and, more particularly, to a weighted blanket compatible for use with a magnetic resonance imaging (MRI) system.

Non-invasive imaging technologies allow images of the internal structures or features of a patient/object to be obtained without performing an invasive procedure on the patient/object. In particular, such non-invasive imaging technologies rely on various physical principles (such as the differential transmission of X-rays through a target volume, the reflection of acoustic waves within the volume, the paramagnetic properties of different tissues and materials within the volume, the breakdown of targeted radionuclides within the body, and so forth) to acquire data and to construct images or otherwise represent the observed internal features of the patient/object.

During MRI, when a substance such as human tissue is subjected to a uniform magnetic field (polarizing field $B_0$), the individual magnetic moments of the spins in the tissue attempt to align with this polarizing field, but precess about it in random order at their characteristic Larmor frequency. If the substance, or tissue, is subjected to a magnetic field (excitation field $B_1$) which is in the x-y plane and which is near the Larmor frequency, the net aligned moment, or "longitudinal magnetization", $M_z$, may be rotated, or "tipped", into the x-y plane to produce a net transverse magnetic moment, $M_t$. A signal is emitted by the excited spins after the excitation signal $B_1$ is terminated and this signal may be received and processed to form an image.

When utilizing these signals to produce images, magnetic field gradients ($G_x$, $G_y$, and $G_z$) are employed. Typically, the region to be imaged is scanned by a sequence of measurement cycles in which these gradient fields vary according to the particular localization method being used. The resulting set of received nuclear magnetic resonance (NMR) signals are digitized and processed to reconstruct the image using one of many well-known reconstruction techniques.

MR scan examinations can induce anxiety and stress for some patients. This often can lead to patient movement which can increase scan time and/or produce image artifacts.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a weighted blanket is provided. The weighted blanket includes a flexible and woven fabric enclosure. The weighted blanket also includes a non-proton signal generating and non-distorting material enclosed within the flexible and woven fabric enclosure. The weighted blanket is magnetic resonance compatible for use on a subject during a magnetic resonance imaging scan.

In another embodiment, a weighted blanket is provided. The weighted blanket includes a flexible and flame resistant and retardant woven fabric enclosure. The weighted blanket also includes polycarbonate plastic beads enclosed within the flexible and flame resistant and retardant woven fabric enclosure. The weighted blanket is magnetic resonance compatible for use on a subject during a magnetic resonance imaging scan.

In a further embodiment, a method for manufacturing a weighted blanket is provided. The method includes providing a first layer and a second layer of a flexible and woven fabric. The method also includes providing a non-proton signal generating and non-distorting material. The method further includes enclosing the non-proton signal generating and non-distorting material between the first layer and the second layer. The weighted blanket is magnetic resonance compatible for use on a subject during a magnetic resonance imaging scan.

BRIEF DESCRIPTION OF THE DRAWINGS

These and other features, aspects, and advantages of the present subject matter will become better understood when the following detailed description is read with reference to the accompanying drawings in which like characters represent like parts throughout the drawings, wherein.

DETAILED DESCRIPTION

Figure 1:
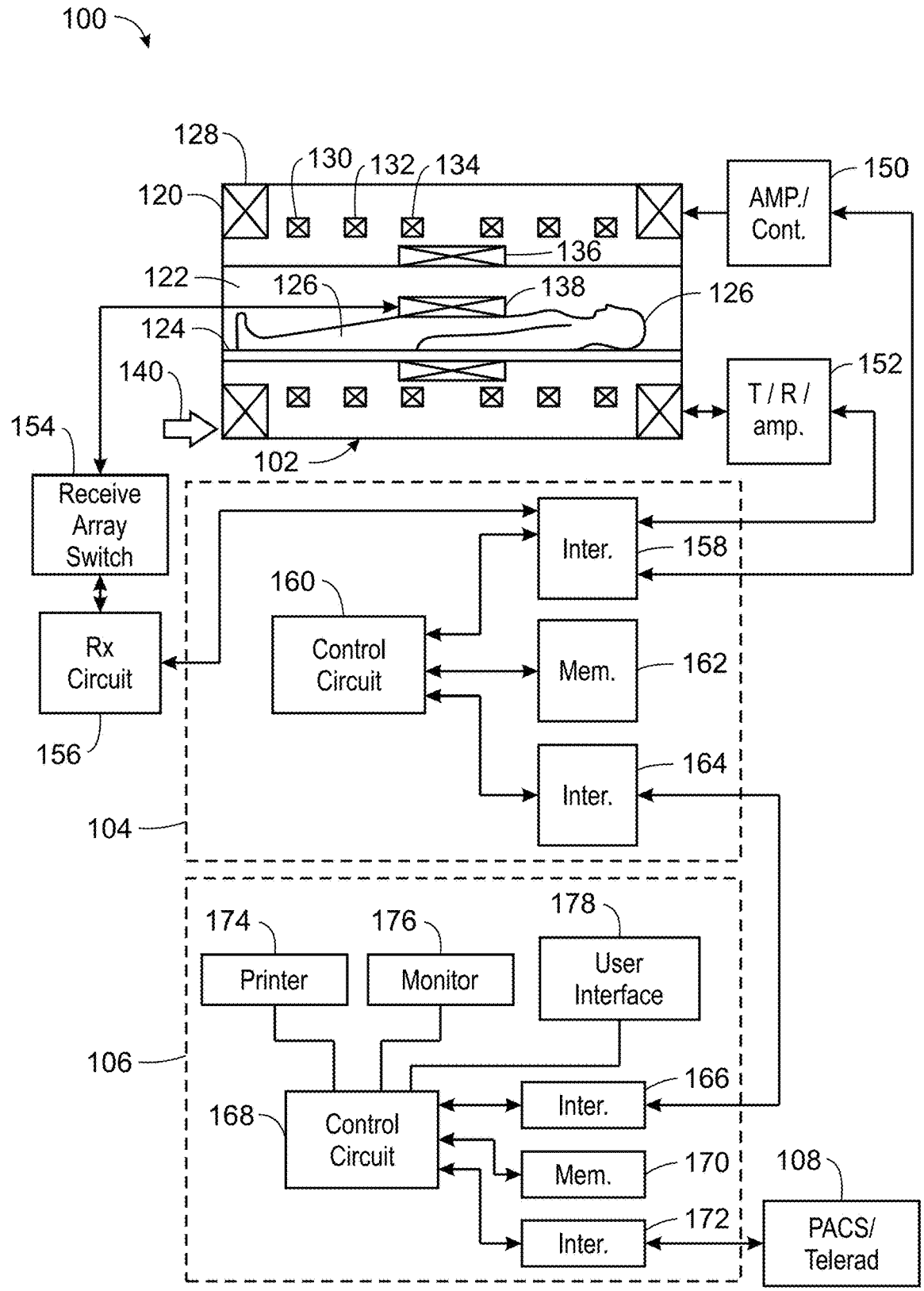
FIG. 1 illustrates an embodiment of a magnetic resonance imaging (MRI) system suitable for use with the disclosed technique.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

The present disclosure provides embodiments of a weighted blanket for use during an MRI scan. In particular, the weighted blanket is MR compatible for use on a subject (e.g., patient) during an MRI scan. The weighted blanket includes a flexible and woven fabric enclosure. The flexible and woven fabric enclosure is flame resistant and retardant. The weighted blanket also includes a non-proton signal generating and non-distorting material enclosed within the flexible and woven fabric enclosure. For example, the non-proton signal generating and non-distorting material may be made of granular beads (e.g., polycarbonate plastic beads). In certain embodiments, the weighted blanket includes an outer sleeve that can be disposed about the flexible and woven fabric enclosure within the non-proton signal generating and non-distorting material enclosed within. Images may be printed on the outer sleeve that are configured to be fun and colorful to calm or distract the subject (e.g., pediatric population/group).

The flexible and woven fabric enclosure and the non-proton signal generating and non-distorting material are coupled (e.g., stitched or sealed) together. In certain embodiments, the flexible and woven fabric enclosure and the non-proton signal generating and non-distorting material are coupled together in a pattern to maximize weight distribution throughout the weighted blanket. In certain embodiments, the flexible and woven fabric enclosure and the non-proton signal generating and non-distorting material are coupled together in a pattern to distribute weight in the weighted blanket to align with loops of a radio frequency (RF) coil within an RF receiving coil assembly disposed on the subject when the weighted blanket is placed on the RF receiving coil assembly. In this embodiment, the flexible and woven fabric enclosure has one or more visible markers to properly orient the weighted blanket with respect to the RF receiving coil assembly when the weighted blanket is placed on the RF receiving coil assembly to ensure the weight within the weighted blanket is aligned with the loops of the RF coil. In certain embodiments, the flexible and woven fabric enclosure and the non-proton signal generating and non-distorting material are coupled together in a pattern to distribute the weight in the weighted blanket to move the loops of the RF coil within the RF receiving coil assembly disposed on the subject closer to the subject when the weighted blanket is placed on the RF receiving coil assembly.

The weighted blanket is configured to comfort a patient and enhance the patient experience during an MRI scan. This may then reduce patient movement. By reducing patient movement, scan time and image artifacts may be reduced. Further, the weighted blanket may push the loops or elements of the RF coil within the RF receiving coil assembly closer to the body of the patient for optimal coil loading.

With the preceding in mind, FIG. 1 a magnetic resonance imaging (MRI) system 100 is illustrated schematically as including a scanner 102, scanner control circuitry 104, and system control circuitry 106. According to the embodiments described herein, the MRI system 100 is generally configured to perform MR imaging. As described in greater detail below, a weighted blanket may be disposed on a patient 126 during a scan with the MRI system 100. The weighted blanket is MR compatible.

System 100 additionally includes remote access and storage systems or devices such as picture archiving and communication systems (PACS) 108, or other devices such as teleradiology equipment so that data acquired by the system 100 may be accessed on- or off-site. In this way, MR data may be acquired, followed by on- or off-site processing and evaluation. While the MRI system 100 may include any suitable scanner or detector, in the illustrated embodiment, the system 100 includes a full body scanner 102 having a housing 120 through which a bore 122 is formed. A table 124 is moveable into the bore 122 to permit a patient 126 to be positioned therein for imaging selected anatomy within the patient.

Scanner 102 includes a series of associated coils for producing controlled magnetic fields for exciting the gyromagnetic material within the anatomy of the subject being imaged. Specifically, a primary magnet coil 128 is provided for generating a primary magnetic field, $B_0$, which is generally aligned with the bore 122. A series of gradient coils 130, 132, and 134 permit controlled magnetic gradient fields to be generated for positional encoding of certain gyromagnetic nuclei within the patient 126 during examination sequences. A radio frequency (RF) coil 136 (e.g., RF transmit coil) is configured to generate radio frequency pulses for exciting the certain gyromagnetic nuclei within the patient. In addition to the coils that may be local to the scanner 102, the system 100 also includes a set of receiving coils or RF receiving coils 138 (e.g., an array of coils) configured for placement proximal (e.g., against) to the patient 126. As an example, the receiving coils 138 can include cervical/thoracic/lumbar (CTL) coils, head coils, single-sided spine coils, and so forth. Generally, the receiving coils 138 are placed close to or on top of the patient 126 so as to receive the weak RF signals (weak relative to the transmitted pulses generated by the scanner coils) that are generated by certain gyromagnetic nuclei within the patient 126 as they return to their relaxed state.

The various coils of system 100 are controlled by external circuitry to generate the desired field and pulses, and to read emissions from the gyromagnetic material in a controlled manner. In the illustrated embodiment, a main power supply 140 provides power to the primary field coil 128 to generate the primary magnetic field, Bo. A power input (e.g., power from a utility or grid), a power distribution unit (PDU), a power supply (PS), and a driver circuit 150 may together provide power to pulse the gradient field coils 130, 132, and 134. The driver circuit 150 may include amplification and control circuitry for supplying current to the coils as defined by digitized pulse sequences output by the scanner control circuitry 104.

Another control circuit 152 is provided for regulating operation of the RF coil 136. Circuit 152 includes a switching device for alternating between the active and inactive modes of operation, wherein the RF coil 136 transmits and does not transmit signals, respectively. Circuit 152 also includes amplification circuitry configured to generate the RF pulses. Similarly, the receiving coils 138 are connected to switch 154, which is capable of switching the receiving coils 138 between receiving and non-receiving modes. Thus, the receiving coils 138 resonate with the RF signals produced by relaxing gyromagnetic nuclei from within the patient 126 while in the receiving mode, and they do not resonate with RF energy from the transmitting coils (i.e., coil 136) so as to prevent undesirable operation while in the non-receiving mode. Additionally, a receiving circuit 156 is configured to receive the data detected by the receiving coils 138 and may include one or more multiplexing and/or amplification circuits.

It should be noted that while the scanner 102 and the control/amplification circuitry described above are illustrated as being coupled by a single line, many such lines may be present in an actual instantiation. For example, separate lines may be used for control, data communication, power transmission, and so on. Further, suitable hardware may be disposed along each type of line for the proper handling of the data and current/voltage. Indeed, various filters, digitizers, and processors may be disposed between the scanner and either or both of the scanner and system control circuitry 104, 106.

As illustrated, scanner control circuitry 104 includes an interface circuit 158, which outputs signals for driving the gradient field coils and the RF coil and for receiving the data representative of the magnetic resonance signals produced in examination sequences. The interface circuit 158 is coupled to a control and analysis circuit 160. The control and analysis circuit 160 executes the commands for driving the circuit 150 and circuit 152 based on defined protocols selected via system control circuit 106.

Control and analysis circuit 160 also serves to receive the magnetic resonance signals and performs subsequent processing before transmitting the data to system control circuit 106. Scanner control circuit 104 also includes one or more memory circuits 162, which store configuration parameters, pulse sequence descriptions, examination results, and so forth, during operation.

Interface circuit 164 is coupled to the control and analysis circuit 160 for exchanging data between scanner control circuitry 104 and system control circuitry 106. In certain embodiments, the control and analysis circuit 160, while illustrated as a single unit, may include one or more hardware devices. The system control circuit 106 includes an interface circuit 166, which receives data from the scanner control circuitry 104 and transmits data and commands back to the scanner control circuitry 104. The control and analysis circuit 168 may include a CPU in a multi-purpose or application specific computer or workstation. Control and analysis circuit 168 is coupled to a memory circuit 170 to store programming code for operation of the MRI system 100 and to store the processed image data for later reconstruction, display and transmission. The programming code may execute one or more algorithms that, when executed by a processor, are configured to perform reconstruction of acquired data as described below. In certain embodiments, the memory circuit 170 may store one or more neural networks for reconstruction of acquired data as described below. In certain embodiments, image reconstruction may occur on a separate computing device having processing circuitry and memory circuitry.

An additional interface circuit 172 may be provided for exchanging image data, configuration parameters, and so forth with external system components such as remote access and storage devices 108. Finally, the system control and analysis circuit 168 may be communicatively coupled to various peripheral devices for facilitating operator interface and for producing hard copies of the reconstructed images. In the illustrated embodiment, these peripherals include a printer 174, a monitor 176, and user interface 178 including devices such as a keyboard, a mouse, a touchscreen (e.g., integrated with the monitor 176), and so forth.

Figure 2:
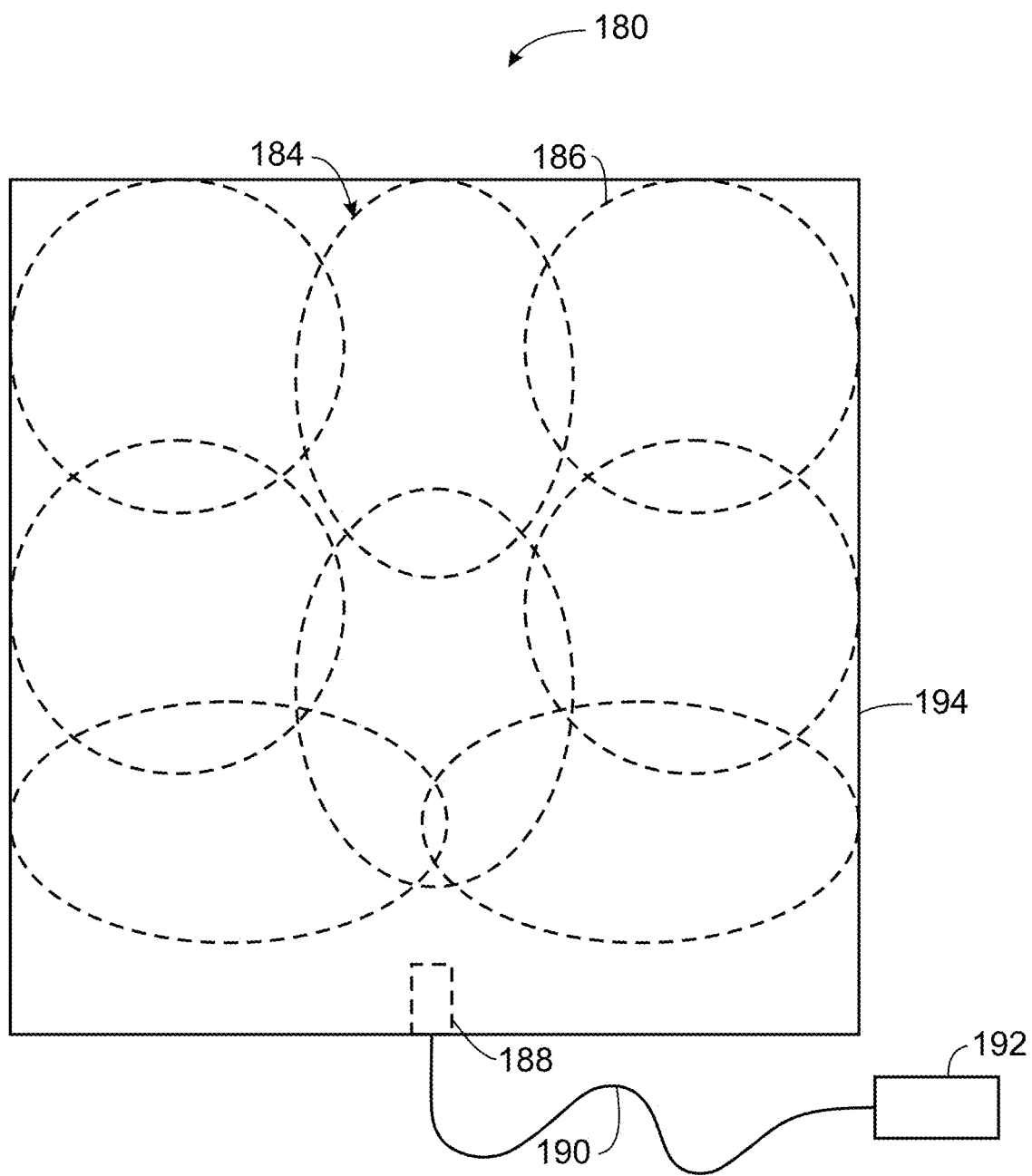
FIG. 2 is a schematic diagram of an RF coil assembly, in accordance with aspects of the present disclosure.

FIG. 2 is a schematic diagram of an RF coil assembly 180 (e.g., RF receiving coil assembly) that may be disposed on a patient during an MRI scan. The RF coil assembly 180 may be utilized in an MRI system (e.g., MRI system 100 in FIG. 1). As described in greater detail below, a weighted blanket may be disposed on the patient having the RF coil assembly 180 already disposed on them. The RF coil assembly 180 includes an RF coil 184 having a plurality of loops 186 (e.g., elements or channels). Each loop 186 is coupled to an electronics unit coupled to a coil-interfacing cable. The coil-interfacing cables of each of the loops 186 is coupled to an electrical connector interface or interface circuitry 188 (e.g., a balun such as integrated balun cable harness which may act as an RF trap). The electrical connector interface 188 is coupled (via a cable 190) to a P connector 192 (e.g., port connector) that enables the RF coil assembly 180 to be coupled (e.g., via wired connection) to the interface of the MRI system that couples imaging components to processing components. In certain embodiments, the RF coil assembly 180 may lack a wired connection and may be configured to be utilized wirelessly (e.g., for coupling imaging components to wireless components) with the MRI system during an MRI scan.

Each loop 186 may consist of linked resonator elements coupled to a printed circuit board module (e.g., the electronics unit). Each electronics unit may include various components (e.g., a decoupling circuit, an impedance inverter circuit, and a pre-amplifier). The RF coil 184 may be designed utilizing AIR™ coil technology from General Electric Healthcare. This enables the RF coil 184 to be lightweight and flexible. Each loop 186 includes a malleable (e.g., flexible) conductor that enables complex and irregular surface contours. In certain embodiments, each loop 186 may stretch (e.g., due to a liquid metal conductor). Alternatively, each loop 186 may include litz wire, a regular stranded wire, or a spiral wire woven on an extendible non-conductive support or a meandering trace. In addition, the loops 186 of the RF coil 184 are transparent, thus, aiding signal-to-noise ratios.

The RF coil 184 is disposed within a flexible enclosure 194 (e.g., blanket). As depicted, the flexible enclosure 194 has a rectangular shape. In certain embodiments, the flexible enclosure 194 may have a square shape or other shape.

Figure 3:
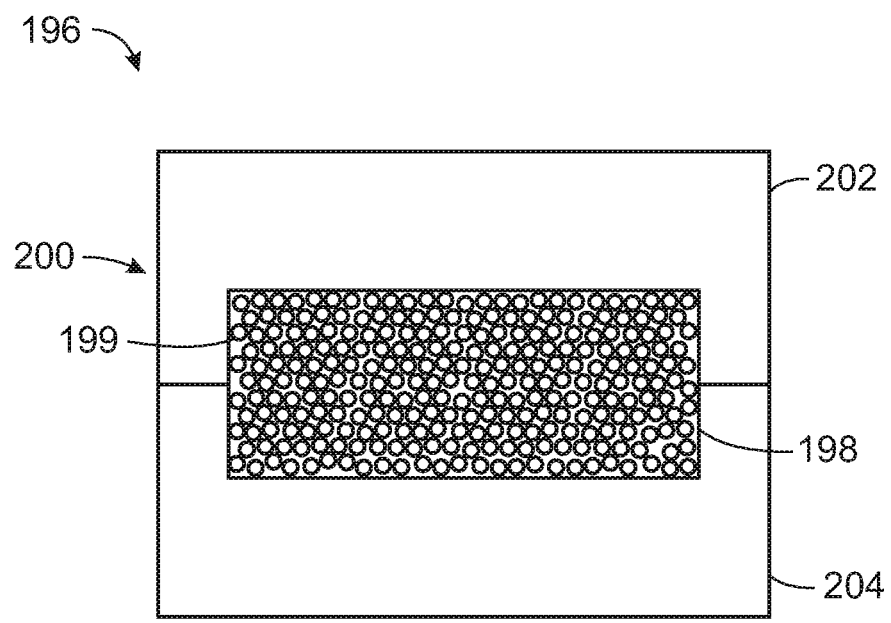
FIG. 3 is a schematic diagram of components of a weighted blanket for use during a scan with an MRI system, in accordance with aspects of the present disclosure.

FIG. 3 is a schematic diagram of components of a weighted blanket 196 for use during a scan with an MRI system (e.g., MRI system 100 in FIG. 1). The weighted blanket 196 is MR compatible for use on the patient during an MRI scan. In certain embodiments, the weighted blanket 196 is placed directly on the patient for used during the MRI scan. In certain embodiments, weighted blanket 196 is placed on a patient having a body coil (e.g., RF receiving coil assembly 180) disposed on them so that the weighted blanket 196 on the body coil and the patient. The weighted blanket 196 includes an internal layer 198 made of a non-proton signal generating and non-distorting (i.e., will not distort acquired image) material. The non-proton signal generating and non-distorting material may be granular beads 199. In certain embodiments, the granular beads 199 may be polycarbonate plastic beads (e.g., polycarbonate resin thermoplastic beads such as LEXAN® beads from General Electric).

The weighted blanket 196 also includes a flexible and woven fabric enclosure 200. The internal layer 198 is enclosed within the flexible and woven fabric enclosure 200. The flexible and woven fabric enclosure 200 includes a first layer 202 and a second layer 204 that encloses (e.g., sandwiches) the internal layer 198 between them. The first layer 202, the internal layer 198, and the second layer 204 are coupled (e.g., sealed or stitched) together to form the weighted blanket 196. The first layer 202 and the second layer 204 may be made of a flame resistant and retardant fabric. In particular, the first layer 202 and the second layer 204 may be made of V0/V1/V2-rated fabric (with respect to the flammability testing standard UL 94). For example, the first layer 202 and the second layer 204 may be made of Omniweave™ from TenCate.

In certain embodiments, the first layer 202 and second layer 204 may be stitched together in a pattern forming pockets having the granular material of the internal layer 198. In certain embodiments, the flexible and woven fabric enclosure 200 and the internal layer 198 may be coupled together in a pattern to maximize weight distribution throughout the weighted blanket 196. In certain embodiments, the flexible and woven fabric enclosure 200 and the internal layer 198 may be coupled together in a pattern to distribute weight in the weighted blanket 196 to align with loops of an RF coil within an RF receiving coil assembly (e.g., RF receiving coil assembly 180 in FIG. 2) disposed on the patient when the weighted blanket 196 is placed on the RF receiving coil assembly. In certain embodiment, the flexible and woven fabric enclosure 200 has one or more visible markers to properly orient the weighted blanket 196 with respect to the RF receiving coil assembly when the weighted blanket 196 is placed on the RF receiving coil assembly to ensure the weight within the weighted blanket 196 is aligned with the loops of the RF coil. In certain embodiments, the flexible and woven fabric enclosure 200 and the internal layer 198 are coupled together in a pattern to distribute weight in the weighted blanket to move loops or elements of the RF coil within the RF receiving coil assembly disposed on the patient closer to the patient when the weighted blanket is placed on the RF receiving coil assembly.

Figure 4:
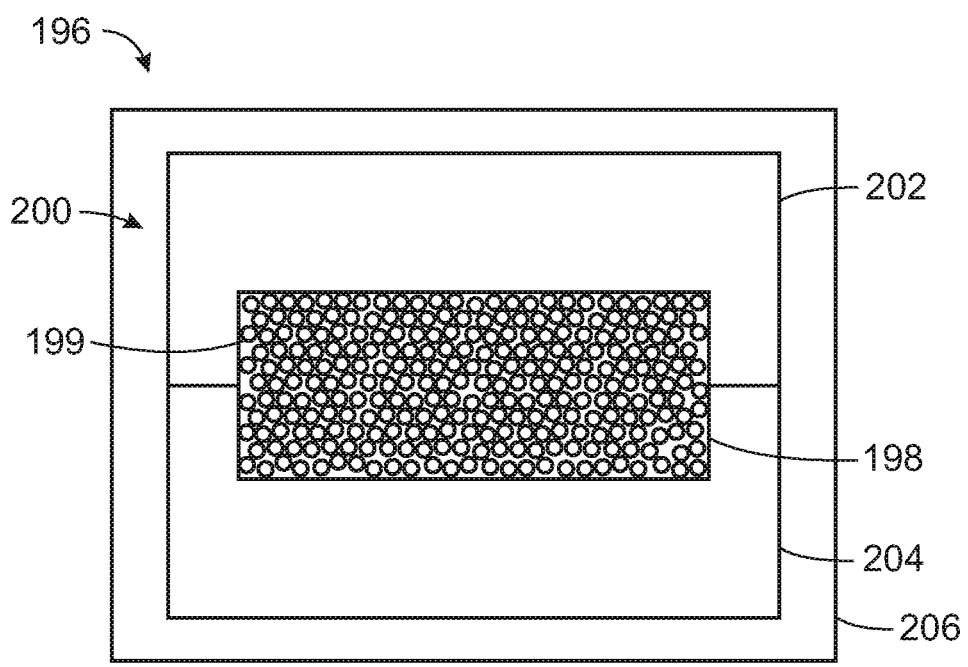
FIG. 4 is a schematic diagram of components of a weighted blanket for use during a scan with an MRI system (e.g., having an outer sleeve), in accordance with aspects of the present disclosure.
Figure 5:
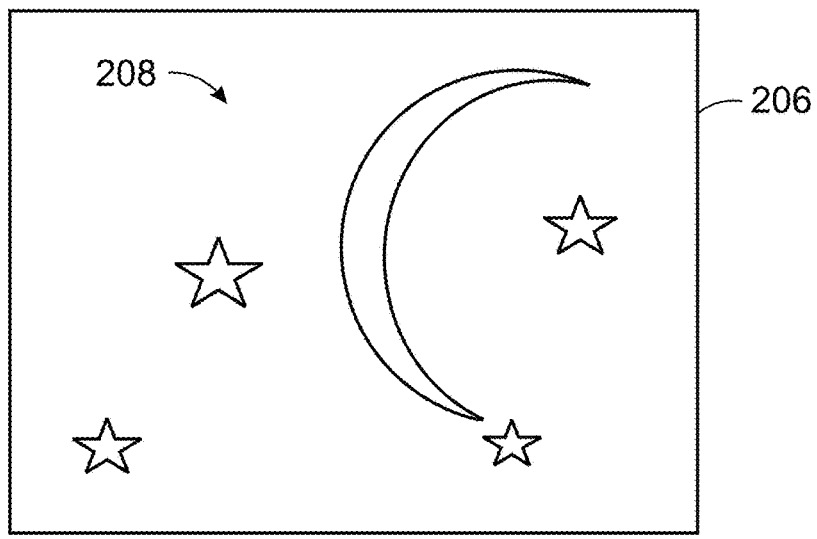
FIG. 5 is a schematic diagram of a top view of an outer sleeve for a weighted blanket, in accordance with aspects of the present disclosure.

FIG. 4 is a schematic diagram of components of the weighted blanket 196 for use during a scan with an MRI system (e.g., having an outer sleeve 206). The weighted blanket 196 is as described in FIG. 3. As depicted in FIG. 4, the weighted blanket 196 includes an outer sleeve 206 (e.g., removable outer sleeve). The outer sleeve 206 is made of fabric (e.g., same material as the flexible and woven fabric enclosure 200). The outer sleeve 206 is disposed about and encloses the flexible and woven fabric enclosure 200 with the internal layer 198 enclosed within. The outer sleeve 206 may be both cheap and disposable. Use of the outer sleeve 206 may help keep the weighted blanket 196 clean. The outer sleeve 206 may include fun and/or colorful features or images printed (e.g., silkscreen printed) on it. These features or images may keep the patient (e.g., child patient) calm and/or distracted during the MRI scan to keep the patient still. FIG. 5 illustrates an example of features or images 208 that may be printed on the outer sleeve 206. The features or images 208 utilized on the outer sleeve 206 may vary. In certain embodiments, the features or images 208 may correspond to a theme within the scan room.

Figure 6:
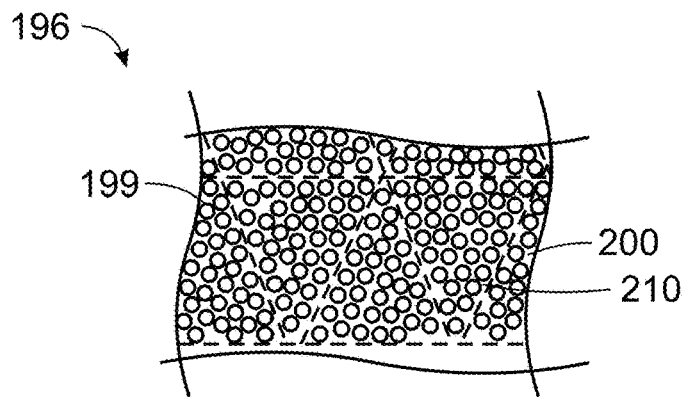
FIG. 6 is a top view of a portion of a weighted blanket having a triangular pattern (e.g., having all pockets filled with granular beads), in accordance with aspects of the present disclosure.
Figure 7:
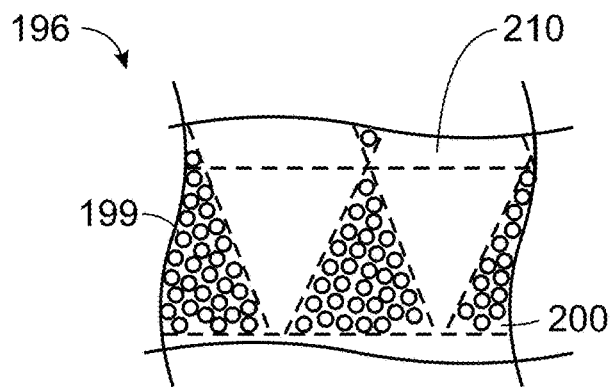
FIG. 7 is a top view of a portion of a weighted blanket having a triangular pattern (e.g., having only some pockets filled with granular beads), in accordance with aspects of the present disclosure.

As mentioned above, the components of the weighted blanket 196 may be coupled (e.g., stitched or sealed) together in certain patterns (e.g., tessellated patterns). FIG. 6 is a top view of a portion of the weighted blanket 196 having a triangular pattern. In FIG. 6, the flexible and woven fabric enclosure 200 forms pockets 210 having a triangular shape. Granular material 199 (e.g., polycarbonate plastic beads) are disposed within these pockets 210. In certain embodiments, each of the pockets 210 are filled with the granular beads 199 as depicted in FIG. 6. In certain embodiments, only some of the pockets 210 are filled with the granular beads 199 as depicted in FIG. 7. In certain embodiments, the beads 199 may be distributed in the different pockets 210 to maximize weight distribution throughout the weighted blanket 196.

Figure 8:
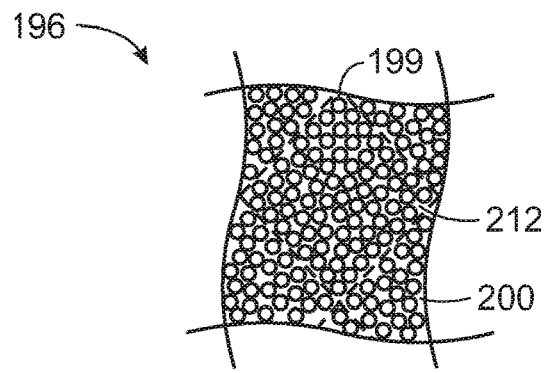
FIG. 8 is a top view of a portion of a weighted blanket having a diamond pattern, in accordance with aspects of the present disclosure.

FIG. 8 is a top view of a portion of the weighted blanket 196 having a diamond pattern. In FIG. 8, the flexible and woven fabric enclosure 200 forms pockets 212 having a triangular shape. Granular material 199 (e.g., polycarbonate plastic beads) are disposed within these pockets 212. In certain embodiments, each of the pockets 212 are filled with the granular beads 199 as depicted. In certain embodiments, only some of the pockets 212 are filled with the granular beads 199. In certain embodiments, the beads 199 may be distributed in the different pockets 212 to maximize weight distribution throughout the weighted blanket 196.

Figure 9:
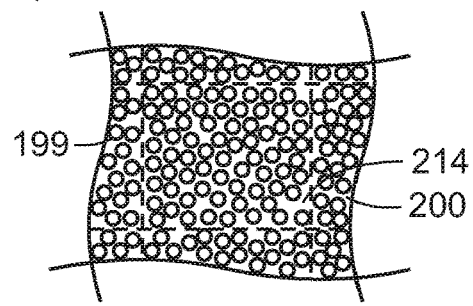
FIG. 9 is a top view of a portion of a weighted blanket having a square pattern, in accordance with aspects of the present disclosure.

FIG. 9 is a top view of a portion of the weighted blanket 196 having a square pattern. In FIG. 9, the flexible and woven fabric enclosure 200 forms pockets 214 having a square shape. Granular material 199 (e.g., polycarbonate plastic beads) are disposed within these pockets 212. In certain embodiments, each of the pockets 214 are filled with the granular beads 199 as depicted. In certain embodiments, only some of the pockets 214 are filled with the granular beads 199. In certain embodiments, the beads 199 may be distributed in the different pockets 214 to maximize weight distribution throughout the weighted blanket 196.

Figure 10:
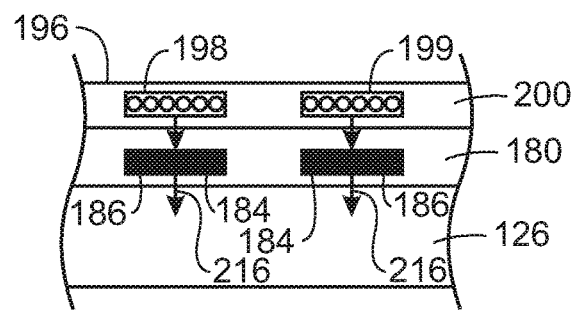
FIG. 10 is a schematic diagram illustrating the distribution of weight in a weighted blanket relative to an RF coil assembly, in accordance with aspects of the present disclosure.

FIG. 10 is a schematic diagram illustrating the distribution of weight (e.g., via the granular beads 199) in the weighted blanket 196 relative to the RF coil assembly 180. In particular, the flexible and woven fabric enclosure 200 and the internal layer 198 may be coupled together in a pattern to distribute weight in the weighted blanket 196 to align with loops or elements 186 of the RF coil 184 within the RF receiving coil assembly 180 disposed on the patient 126 when the weighted blanket 196 is placed on the RF receiving coil assembly 180. As depicted, the flexible and woven fabric enclosure 200 and the internal layer 198 are coupled together in a pattern to distribute weight (e.g., via the granular beads 199) in the weighted blanket 196 to move the loops or elements 186 of the RF coil 184 within the RF receiving coil assembly 180 disposed on the patient 126 closer to the patient 126 (as indicated by arrows 216) when the weighted blanket 196 is placed on the RF receiving coil assembly 180. Pushing the loops or elements 186 of the RF coil 184 within the RF receiving coil assembly 180 closer to the body of the patient 126 provides for optimal coil loading.

Figure 11:
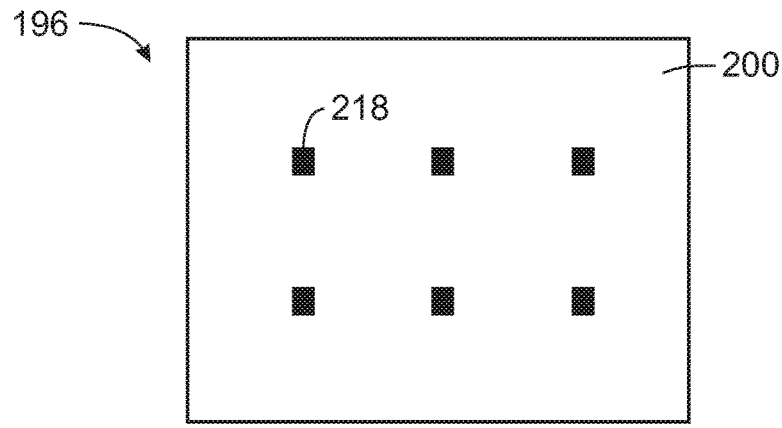
FIG. 11 is a top view of a weighted blanket having markers for alignment.

FIG. 11 is a top view of the weighted blanket 196 having markers 218 for alignment. The flexible and woven fabric enclosure 200 has one or more visible markers 218 to properly orient the weighted blanket 196 with respect to the RF receiving coil assembly when the weighted blanket 196 is placed on the RF receiving coil assembly to ensure the weight within the weighted blanket 196 is aligned with the loops of the RF coil. As depicted, markers 218 on the flexible and woven fabric enclosure 200 indicate areas weighted areas to be aligned with loops of the RF coil. The number and location of the markers 218 and how the markers 218 are utilized for alignment may vary. For example, the markers 218 may indicate to align or orient a corner of the weighted blanket 196 with respect to a particular portion of the RF receiving coil assembly.

Figure 12:
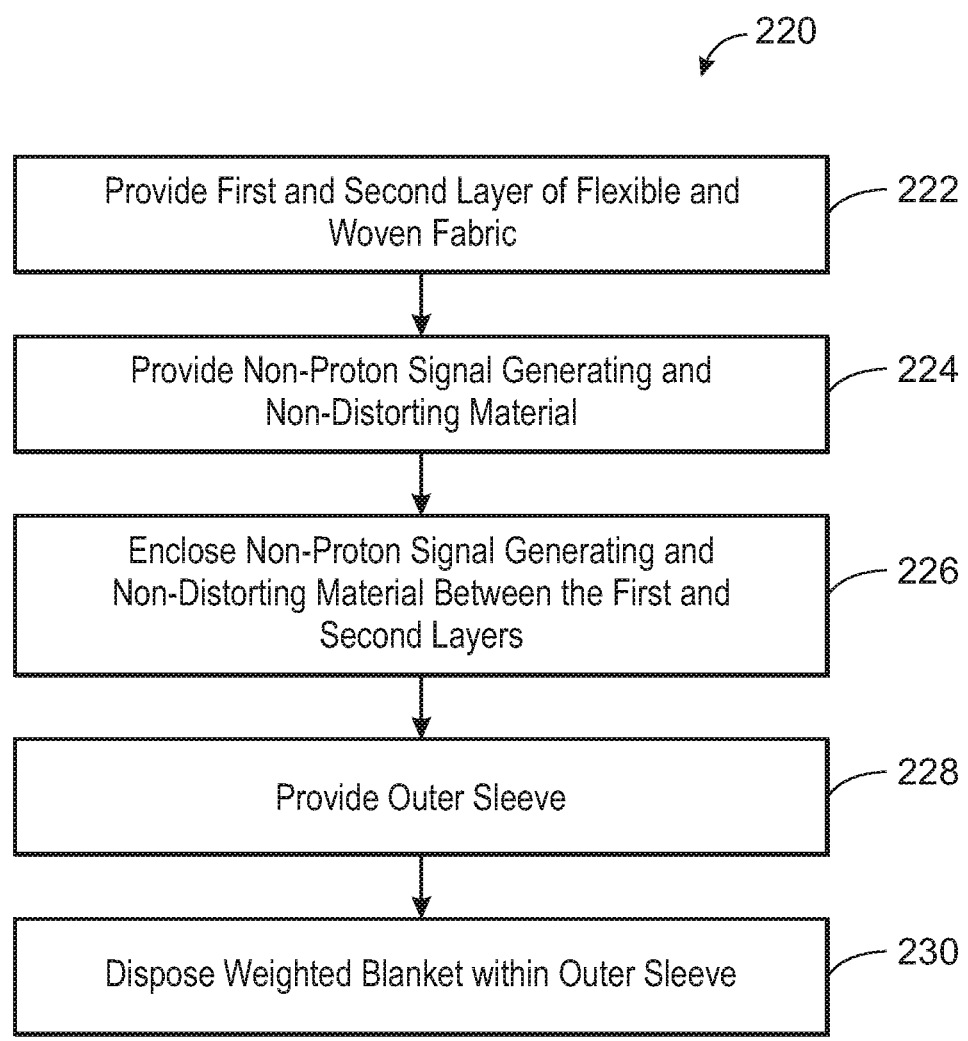
FIG. 12 is a flow chart of a method for manufacturing a weighted blanket, in accordance with aspects of the present disclosure.

FIG. 12 is a flow chart of a method 220 for manufacturing a weighted blanket. One or more steps of the method 220 may be performed at the same time or in a different order from that depicted. The weighted blanket is MR compatible for use on a patient during an MRI scan. The method 220 includes providing a first layer and a second layer of a flexible and woven fabric enclosure (block 222). The first layer and the second layer may be made of a flame resistant and retardant fabric. In particular, the first layer and the second layer may be made of V0/V1/V2-rated fabric (with respect to the flammability testing standard UL 94). For example, the first layer and the second layer may be made of Omniweave™ from TenCate.

The method 220 also includes providing a non-proton signal generating and non-distorting material (block 224). The non-proton signal generating and non-distorting material may be granular beads. In certain embodiments, the granular beads may be polycarbonate plastic beads (e.g., polycarbonate resin thermoplastic beads such as LEXAN® beads from General Electric).

The method 220 further includes enclosing the non-proton signal generating and non-distorting material between the first layer and the second layer (block 226). The first layer and second layer may be stitched together in a pattern that forms pockets having the non-proton signal generating and non-distorting material disposed within the pockets.

In certain embodiments, the method 220 includes providing an outer sleeve (e.g., disposable and removable) (block 228). In certain embodiments, the method 220 includes disposing the weighted blanket within the outer sleeve (block 230). The outer sleeve may include fun and/or colorful features or images printed (e.g., silkscreen printed) on it. These features or images may keep the patient (e.g., child patient) calm and/or distracted during the MRI scan to keep the patient still.

Technical effects of the disclosed subject matter include providing a weighting blanket that is magnetic resonance compatible for use on a subject during a magnetic resonance imaging scan. The weighted blanket includes a flexible and flame resistant and retardant woven fabric enclosure. The weighted blanket further includes a non-proton-signal generating and non-distorting material enclosed within the flexible and flame resistant and retardant woven fabric enclosure. Technical effects of the disclosed subject matter include comforting a patient and reducing patient movement. Technical effects of the disclosed subject matter include reducing scan time and reducing image artifacts.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

This written description uses examples to disclose the present subject matter, including the best mode, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A weighted blanket, comprising:
a flexible and woven fabric enclosure; and
a non-proton signal generating and non-distorting material enclosed within the flexible and woven fabric enclosure, wherein the weighted blanket is magnetic resonance compatible for use on a subject during a magnetic resonance imaging scan, wherein the flexible and woven fabric enclosure and the non-proton signal generating and non-distorting material are coupled together in a pattern to distribute weight in the weighted blanket to align with loops of a radio frequency (RF) coil within an RF receiving coil assembly disposed on the subject when the weighted blanket is placed on the RF receiving coil assembly.

2. The weighted blanket of claim 1, wherein the non-proton signal generating and non-distorting material comprises granular beads.

3. The weighted blanket of claim 2, wherein the granular beads comprise polycarbonate plastic beads.

4. The weighted blanket of claim 1, wherein the flexible and woven fabric enclosure is made of a flame resistant and retardant material.

5. The weighted blanket of claim 1, further comprises an outer sleeve disposed about the flexible and woven fabric enclosure with the non-proton signal generating and non-distorting material enclosed within.

6. The weighted blanket of claim 5, wherein images are printed on the outer sleeve that are configured to calm or distract the subject.

7. The weighted blanket of claim 1, wherein the flexible and woven fabric enclosure and the non-proton signal generating and non-distorting material are coupled together in a pattern to maximize weight distribution throughout the weighted blanket.

8. The weighted blanket of claim 1, wherein the flexible and woven fabric enclosure has one or more visible markers to properly orient the weighted blanket with respect to the RF receiving coil assembly when the weighted blanket is placed on the RF receiving coil assembly to ensure the weight within the weighted blanket is aligned with the loops of the RF coil.

9. The weighted blanket of claim 1, wherein the flexible and woven fabric enclosure and the non-proton signal generating and non-distorting material are coupled together in a pattern to distribute weight in the weighted blanket to move the loops of the RF coil within the RF receiving coil assembly disposed on the subject closer to the subject when the weighted blanket is placed on the RF receiving coil assembly.

10. A weighted blanket, comprising:
a flexible and flame resistant and retardant woven fabric enclosure; and
polycarbonate plastic beads enclosed within the flexible and flame resistant and retardant woven fabric enclosure, wherein the weighted blanket is magnetic resonance compatible for use on a subject during a magnetic resonance imaging scan, wherein the flexible and flame resistant and retardant woven fabric enclosure and the polycarbonate plastic beads are coupled together in a pattern to distribute weight in the weighted blanket to align with loops of a radio frequency (RF) coil within an RF receiving coil assembly disposed on the subject when the weighted blanket is placed on the RF receiving coil assembly.

11. The weighted blanket of claim 10, wherein polycarbonate plastic beads are non-proton signal generating and non-distorting.

12. The weighted blanket of claim 10, further comprises an outer sleeve disposed about the flexible and flame resistant and retardant woven fabric enclosure with the polycarbonate plastic beads enclosed within.

13. The weighted blanket of claim 12, wherein images are printed on the outer sleeve that are configured to calm or distract the subject.

14. The weighted blanket of claim 10, wherein the flexible and flame resistant and retardant woven fabric enclosure and the polycarbonate plastic beads are coupled together in a pattern to maximize weight distribution throughout the weighted blanket.

15. The weighted blanket of claim 10, wherein the flexible and flame resistant and retardant woven fabric enclosure has one or more visible markers to properly orient the weighted blanket with respect to the RF receiving coil assembly when the weighted blanket is placed on the RF receiving coil assembly to ensure the weight within the weighted blanket is aligned with the loops of the RF coil.

16. The weighted blanket of claim 10, wherein the flexible and flame resistant and retardant woven fabric enclosure and the polycarbonate plastic beads are coupled together in a pattern to distribute weight in the weighted blanket to move the loops of the RF coil within the RF receiving coil assembly disposed on the subject closer to the subject when the weighted blanket is placed on the RF receiving coil assembly.

17. A method for manufacturing a weighted blanket, comprising:
  providing a first layer and a second layer of a flexible and woven fabric;
  providing a non-proton signal generating and non-distorting material; and
  enclosing the non-proton signal generating and non-distorting material between the first layer and the second layer, wherein the weighted blanket is magnetic resonance compatible for use on a subject during a magnetic resonance imaging scan, and wherein the flexible and woven fabric enclosure and the non-proton signal generating and non-distorting material are coupled together in a pattern to distribute weight in the weighted blanket to align with loops of a radio frequency RF) coil within an RF receiving coil assembly disposed on the subject when the weighted blanket is placed on the RF receiving coil assembly.

18. The method of claim 17, wherein the flexible and woven fabric enclosure is made of a flame resistant and retardant material, and the non-proton signal generating and non-distorting material comprises polycarbonate plastic beads.

* * * * *